(12) United States Patent
Otsuka (10) Patent No.: US 9,521,323 B2
(45) Date of Patent: Dec. 13, 2016

(54) POWER SUPPLY DEVICE HAVING BOOSTING CIRCUIT AND BOOSTING CONTROL APPLICABLE TO ELECTRONIC DEVICES

(71) Applicant: CANON KABUSHIKI KAISHA, Tokyo (JP)

(72) Inventor: Genta Otsuka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/507,618

(22) Filed: Oct. 6, 2014

(65) Prior Publication Data

US 2015/0098016 A1    Apr. 9, 2015

(30) Foreign Application Priority Data

Oct. 7, 2013    (JP) .................................. 2013-210484

(51) Int. Cl.
| | |
|---|---|
| *H04N 5/232* | (2006.01) |
| *H02M 3/156* | (2006.01) |
| *H04N 5/217* | (2011.01) |
| *H05B 33/08* | (2006.01) |
| *H02M 1/00* | (2006.01) |

(52) U.S. Cl.
CPC ......... *H04N 5/23241* (2013.01); *H02M 3/156* (2013.01); *H04N 5/2171* (2013.01); *H05B 33/0818* (2013.01); *H02M 2001/009* (2013.01); *Y02B 20/347* (2013.01); *Y10T 307/406* (2015.04)

(58) Field of Classification Search
CPC .................................................. H04N 5/23241
See application file for complete search history.

(56) References Cited

U.S. PATENT DOCUMENTS

| | | | | |
|---|---|---|---|---|
| 7,339,623 B2* | 3/2008 | Kawai | .................. | H04N 5/2254 348/340 |
| 8,907,586 B1* | 12/2014 | Reed | .................. | H05B 33/0815 315/291 |
| 2008/0007322 A1* | 1/2008 | Asazu | ................... | H02M 3/156 327/536 |

FOREIGN PATENT DOCUMENTS

| | | | |
|---|---|---|---|
| JP | 2006-101637 A | | 4/2006 |
| JP | 2006101637 A | * | 4/2006 |

* cited by examiner

*Primary Examiner* — Gary C Vieaux
(74) *Attorney, Agent, or Firm* — Canon U.S.A., Inc. IP Division (57) ABSTRACT

A power supply device includes a first load circuit that operates by a first voltage; a second load circuit that operates by a second voltage higher than the first voltage; a boosting circuit that generates the first voltage if the power supply device is in a first driving mode, and generates the second voltage if the power supply device is in a second driving mode; a first feedback circuit that connects the first load circuit and the boosting circuit if the power supply device is in the first driving mode; and a second feedback circuit that connects the first load circuit and the boosting circuit if the power supply device is in the second driving mode. The first load circuit is operated in the first driving mode. The first load circuit and the second load circuit are operated in the second driving mode.

6 Claims, 9 Drawing Sheets

POWER SUPPLY DEVICE HAVING BOOSTING CIRCUIT AND BOOSTING CONTROL APPLICABLE TO ELECTRONIC DEVICES

BACKGROUND

Field of the Invention

The present invention relates to a power supply device including a boosting circuit.

Description of the Related Art

A portable device such as a digital camera uses a liquid crystal display device as a display device for displaying an image or the like. A liquid crystal display device generally uses as a backlight circuit a lighting circuit including white light emitting diodes (LEDs). A liquid crystal display device having an approximately 3-inch display unit often uses a lighting circuit in which four to six white LEDs are connected in series. Since a forward voltage Vf of each white LED is about 3.0 V, a power supply of about 12 to 18 V is required to drive the lighting circuit. Recently, mainstream digital cameras employ a system using a one cell lithium-ion battery or two cell lithium-ion battery. In such a system, a voltage input from the battery is 3 to 9 V. Thus, a boosting circuit is required to drive the above lighting circuit.

Further, to remove dust attached to an image sensor when a lens is replaced in an interchangeable lens digital camera, there has been proposed a technique for vibrating a low pass filter (a quartz plate) placed in the image sensor using a piezoelectric element, thereby removing the dust. In this case, it is necessary to drive the piezoelectric element at a relatively high voltage, namely about 20 to 25 V. Thus, an interchangeable lens digital camera using a one cell lithium-ion battery or two cell lithium-ion battery requires at least two types of boosting circuits. A first boosting circuit is a boosting circuit used for a backlight circuit of a liquid crystal display device, and a second boosting circuit is a boosting circuit used to drive a piezoelectric element. These boosting circuits need to employ a high voltage semiconductor device having excellent switching responsiveness and therefore are relatively expensive.

Japanese Patent Application Laid-Open No. 2006-101637 describes a technique for generating, in a single boosting circuit, driving voltages for driving a first load circuit and a second load circuit, which is driven at a higher voltage than the first load circuit.

A system described in Japanese Patent Application Laid-Open No. 2006-101637 includes two types of feedback circuits (30, 40) for two load circuits (80, 82). A first feedback circuit (30) is a circuit that is highly efficient as a circuit for passing a constant current through LEDs (80), which are a first load circuit. A second feedback circuit (40) is a circuit used to drive a second load circuit (82). If the second feedback circuit (40) is used, excessive power is supplied to the LEDs (80). Thus, a constant-current circuit (42) is connected to a cathode side of the LEDs (80). When the second feedback circuit (40) is used, however, a feedback voltage is varied depending on individual variations and temperature variations in a forward voltage Vf of the LEDs (80). This results in varying an output voltage from a boosting circuit (10).

Further, in the system described in Japanese Patent Application Laid-Open No. 2006-101637, the first feedback circuit (30) may not be able to perform a feedback control for generating a constant current under a condition that an input voltage of the boosting circuit (10) is higher than an output voltage of the boosting circuit (10). For example, the first feedback circuit (30) may not be able to perform the feedback control under a condition that an input voltage from a power source is 5 V to 10 V and a driving voltage of the LEDs (80) operated as a backlight circuit is about 9 V. In such a case, the first feedback circuit (30) cannot perform a constant-current control, and therefore, it is necessary to perform the constant-current control using only the second feedback circuit (40). The system described in Japanese Patent Application Laid-Open No. 2006-101637, however, does not include a circuit for determining such condition. Japanese Patent Application Laid-Open No. 2006-101637 does not describe a condition for determining such condition, either. Further, in the system described in Japanese Patent Application Laid-Open No. 2006-101637, when the first feedback circuit (30) is in a connected state and if the lighting up of the LEDs (80), which operate as the backlight circuit of a liquid crystal display device, has been started, an illuminance of the liquid crystal display device gradually increases. Thus, the liquid crystal display device may display an uncomfortable image.

SUMMARY

According to an aspect of the present invention, it is directed to a novel power supply device or power supply circuit applicable to an electronic device such as an imaging device.

According to another aspect of the present invention, it is directed to a novel boosting circuit and boosting control applicable to an electronic device such as an imaging device.

According to another aspect of the present invention, a power supply device includes a first load circuit that operates by a first voltage; a second load circuit that operates by a second voltage higher than the first voltage; a boosting circuit that generates the first voltage if the power supply device is in a first driving mode, and generates the second voltage if the power supply device is in a second driving mode; a first feedback circuit that connects the first load circuit and the boosting circuit if the power supply device is in the first driving mode; a second feedback circuit that connects the first load circuit and the boosting circuit if the power supply device is in the second driving mode; and a control unit that causes the first load circuit to operate if the power supply device is in the first driving mode, and causes the first load circuit and the second load circuit to operate if the power supply device is in the second driving mode.

Further features and aspects of the present invention will become apparent from the following description of exemplary embodiments.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 5, which is composed of FIGS. 5A and 5B, is a flow chart illustrating an example of an operation of the power supply circuit according to the second exemplary embodiment.

FIG. 7, which is composed of FIGS. 7A and 7B, is a flow chart illustrating an example of an operation of the power supply circuit according to the third exemplary embodiment.

DESCRIPTION OF THE EMBODIMENTS

Exemplary embodiments, features, and aspects of the present invention will be described below with reference to the drawings. Exemplary embodiments of the present invention, however, is not limited to the following exemplary embodiments.

Figure 1:
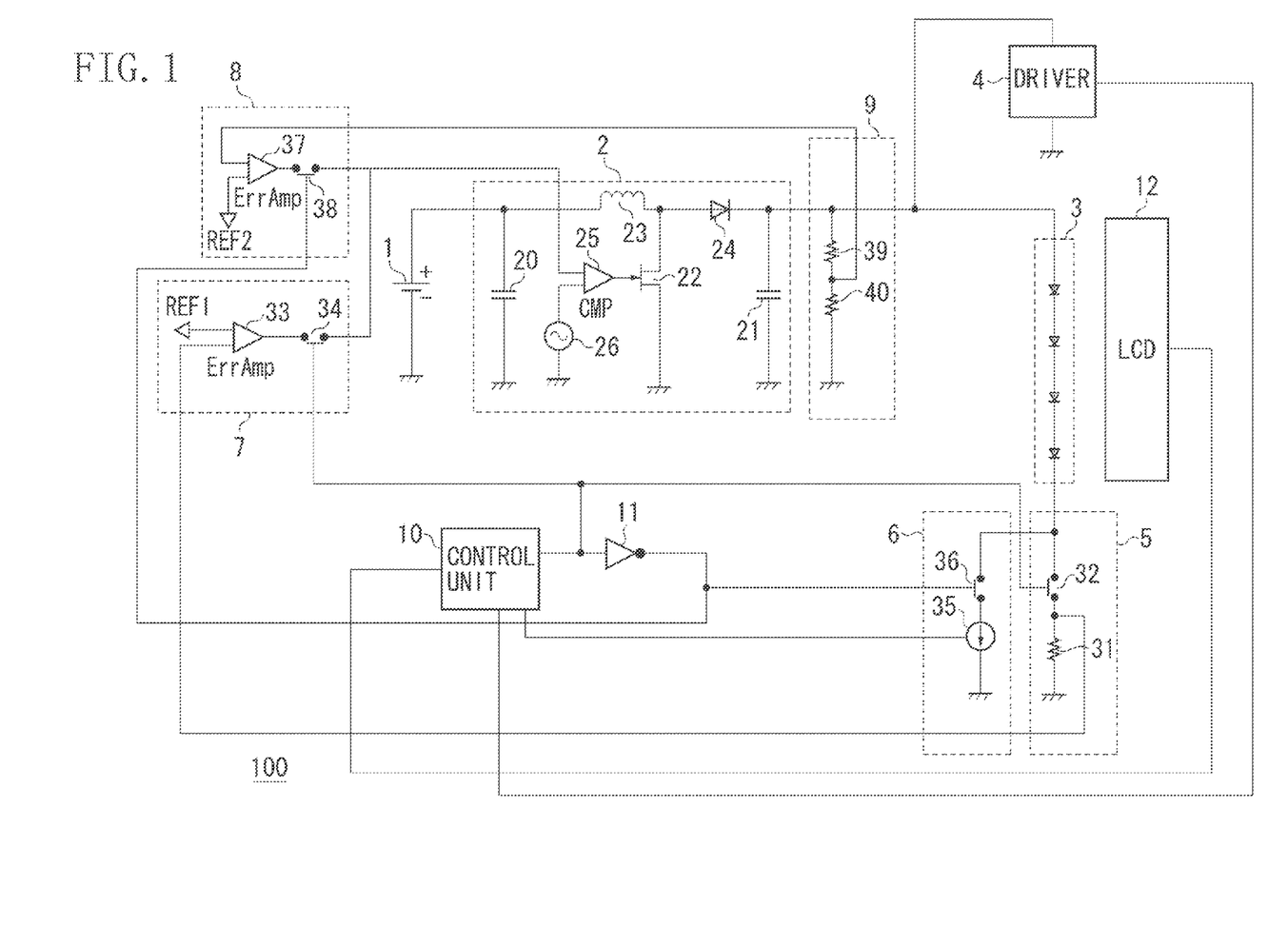
FIG. 1 is a diagram illustrating components of a power supply circuit according to a first exemplary embodiment.

FIG. 1 is a diagram illustrating the components of a power supply circuit 100 according to a first exemplary embodiment. The power supply circuit 100 according to the first exemplary embodiment operates as a power supply device applicable to an electronic device such as an imaging device.

A power source 1 supplies power to the power supply circuit 100. The power source 1 is, for example, a direct-current power source in which an input voltage Vin input from the power source 1 to the power supply circuit 100 is assumed to be about 5 V to 10 V. The power source 1 is assumed to be a lithium-ion battery having two cells or six AA batteries connected in series. The power source 1, however, is not limited to these batteries.

A boosting circuit 2 boosts the input voltage Vin input from the power source 1 to the boosting circuit 2 and outputs an output voltage VOUT. The boosting circuit 2 includes an input capacitor 20, an output capacitor 21, a switching transistor 22, an inductor 23, a rectifying diode 24, a comparator 25, and an oscillation circuit 26. The input capacitor 20 is connected between an input node of the boosting circuit 2 and the ground potential. The output capacitor 21 is connected between an output node of the boosting circuit 2 and ground potential. One end of the inductor 23 is connected to the input node of the boosting circuit 2, and the other end of the inductor 23 is connected to the anode of the rectifying diode 24. The cathode of the rectifying diode 24 is connected to the output node of the boosting circuit 2.

The switching transistor 22 is a transistor for performing switching driving in the boosting circuit 2. The switching transistor 22 is a high voltage transistor of which a switching operation has excellent responsiveness and which can be driven up to a boosted voltage. The drain of the switching transistor 22 is connected to a connection point between the inductor 23 and the rectifying diode 24, and the source of the switching transistor 22 is connected to the ground potential. Further, a control signal output from the comparator 25 is input to the gate of the switching transistor 22. The oscillation circuit 26 generates a triangle wave at a fixed frequency and outputs the generated triangle wave. The comparator 25 compares a signal level of output of a first feedback circuit 7 or a second feedback circuit 8 with a triangle wave output from the oscillation circuit 26. As a result of the comparison by the comparator 25, a control signal subjected to duty control according to a signal level of output of the first feedback circuit 7 or the second feedback circuit 8 is generated and output to the switching transistor 22.

The switching transistor 22 is controlled by the control signal from the comparator 25. If the switching transistor 22 is on, energy is stored in the inductor 23. Then, if the switching transistor 22 has been turned off, the energy stored in the inductor 23 is charged to the output capacitor 21 via the rectifying diode 24. This enables the boosting circuit 2 to boost the input voltage Vin input from the power source 1 to the boosting circuit 2 and supply necessary power to a first load circuit 3 and a second load circuit 4. The second load circuit 4 corresponds to a driver 4.

The first load circuit 3 is a backlight circuit of a liquid crystal display device. The backlight circuit according to the first exemplary embodiment is assumed to be, for example, a circuit in which four white LEDs, each having a forward voltage Vf of about 3.0 V, are connected in series. Thus, a voltage required to drive the first load circuit 3 is assumed to be about 12 V or more. Further, the first load circuit 3 is a circuit that operates as a constant-current driven circuit. The first load circuit 3 can operate in either of a first driving mode and a second driving mode, which will be described below. A liquid crystal display unit 12 and the first load circuit 3 are included as an integrated unit in the liquid crystal display device. The liquid crystal display unit 12 is driven in synchronization with the operation of the first load circuit 3.

If the power supply circuit 100 is in the first driving mode, the power supply circuit 100 performs control to feed back a voltage dropped by a detection resistor circuit 5, which is connected in series to the first load circuit 3, to the boosting circuit 2 via the first feedback circuit 7. This enables the power supply circuit 100 to perform control so that a desired constant current flows through the first load circuit 3. If, however, the power supply circuit 100 is in the first driving mode, a constant-current circuit 6 and the second feedback circuit 8 are not selected. If the power supply circuit 100 is in the first driving mode, the boosting circuit 2 can boost a voltage only as required to pass a constant current through the first load circuit 3. This enables an efficient driving of the boosting circuit 2. If the power supply circuit 100 is in the first driving mode, a change in a resistance value of the detection resistor circuit 5 can vary a current flowing through the first load circuit 3.

Further, if the power supply circuit 100 is in the second driving mode, the power supply circuit 100 selects the constant-current circuit 6, which is connected in series to the first load circuit 3. In this case, the boosting circuit 2 performs a boosting operation based on a voltage detected by an output voltage detection circuit 9. Further, in this case, the boosting circuit 2 performs the boosting operation so that the output voltage VOUT would be equal to or greater than a voltage obtained by adding a voltage required to drive the first load circuit 3 and a voltage required for a normal operation of the constant-current circuit 6. This enables a constant current to flow through the first load circuit 3.

The second load circuit 4, which corresponds to the driver 4, is a load circuit that requires a driving voltage higher than that of the first load circuit 3. The second load circuit 4 operates only if the power supply circuit 100 is in the second driving mode. If the power supply circuit 100 is applied to an imaging device such as an interchangeable lens digital camera, for example, a driving circuit for driving a piezo-electric element corresponds to the second load circuit 4. In this case, to remove dust near an image sensor, the piezo-electric element included in the second load circuit 4 operates as a component for vibrating a low pass filter (a quartz plate) placed in an image sensor. For example, if a voltage required to drive the second load circuit 4 is about 20 V, the boosting circuit 2 performs, based on a voltage detected by the output voltage detection circuit 9, the boosting operation so that the output voltage VOUT of the boosting circuit 2 would be 20 V. This boosting operation enables the boosting circuit 2 to drive the second load circuit 4. A change in a voltage division ratio of resistors in the output voltage detection circuit 9 can change the output voltage VOUT of the boosting circuit 2. Thus, the voltage division ratio of the resistors in the output voltage detection circuit 9 can be appropriately changed according to the voltage required to drive the second load circuit 4.

The detection resistor circuit 5 includes a detection resistor 31 and a switch 32, which corresponds to a first switch. One end of the detection resistor 31 is connected to an output end (a node on lower potential side) of the first load circuit 3 via the switch 32, and the other end of the detection resistor 31 is connected to the ground potential.

The constant-current circuit 6 includes a constant-current supply 35 and a switch 36, which corresponds to a second switch. A series circuit including the constant-current supply 35 and the switch 36 is connected between the output end (the node on the lower potential side) of the first load circuit 3 and the ground potential.

The first feedback circuit 7 includes a first error amplifier 33 and a switch 34, which corresponds to a third switch. To the first error amplifier 33, a potential of the connection point between one end of the detection resistor 31 and the switch 32 (i.e., a voltage dropped by the detection resistor 31) in the detection resistor circuit 5 and a first reference voltage REF1, which is generated by a first reference voltage supply, are input. The output of the first error amplifier 33 is supplied to the comparator 25 in the boosting circuit 2 via the switch 34.

The output voltage detection circuit 9 includes voltage dividing resistors 39 and 40. The voltage dividing resistors 39 and 40 are connected in series between the output node of the boosting circuit 2, that is, an input end (a node on higher potential side) of the first load circuit 3, and the ground potential. A potential of the connection point between the voltage dividing resistors 39 and 40 is output as a voltage detected by the output voltage detection circuit 9.

The second feedback circuit 8 includes a second error amplifier 37 and a switch 38, which corresponds to a fourth switch. To the second error amplifier 37, a voltage detected by the output voltage detection circuit 9 and a second reference voltage REF2, which is generated by a second reference voltage supply, are input. The output of the second error amplifier 37 is supplied to the comparator 25 in the boosting circuit 2 via the switch 38.

A control unit 10 is a microprocessor for controlling an operation of the power supply circuit 100. The control unit 10 selects either of the first feedback circuit 7 and the second feedback circuit 8 and selects either of the circuits 5 and 6. Further, the control unit 10 controls the second load circuit 4 which is connected to the power supply circuit 100, and also controls the liquid crystal display unit 12 which operates in conjunction with the first load circuit 3. A switch control signal output from the control unit 10 is input to the switches 32 and 34 and an inverter 11. The switch control signal inverted by the inverter 11 is input to the switches 36 and 38. In other words, the switches 32 and 34 operate as a first switch group, and the switches 36 and 38 operate as a second switch group. The control unit 10 can exclusively control on/off states of these switch groups.

In the first exemplary embodiment, the first driving mode is a mode for driving only the first load circuit 3. In the first driving mode, the detection resistor circuit 5 is selected as a driving circuit of the first load circuit 3, and also the first feedback circuit 7 is selected. The boosting circuit 2 performs a boosting operation based on an output of the first feedback circuit 7, thereby outputting the output voltage VOUT according to the sum of the forward voltages Vf of the plurality of LEDs included in the first load circuit 3. This drives the first load circuit 3 at a constant current.

Further, the second driving mode is a mode for driving both the first load circuit 3 and the second load circuit 4. In the second driving mode, the constant-current circuit 6 is selected as a driving circuit of the first load circuit 3, and also the output voltage detection circuit 9 and the second feedback circuit 8 are selected. This determines the output voltage VOUT of the boosting circuit 2. Based on a voltage detected by the output voltage detection circuit 9, the boosting circuit 2 generates the output voltage VOUT required to drive the second load circuit 4. At this time, if the output voltage VOUT of the boosting circuit 2 is equal to or greater than a voltage obtained by adding a voltage required to drive the first load circuit 3 and a voltage that allows a normal operation of the constant-current circuit 6, the first load circuit 3 can be driven to operate at a constant current.

Figure 2:
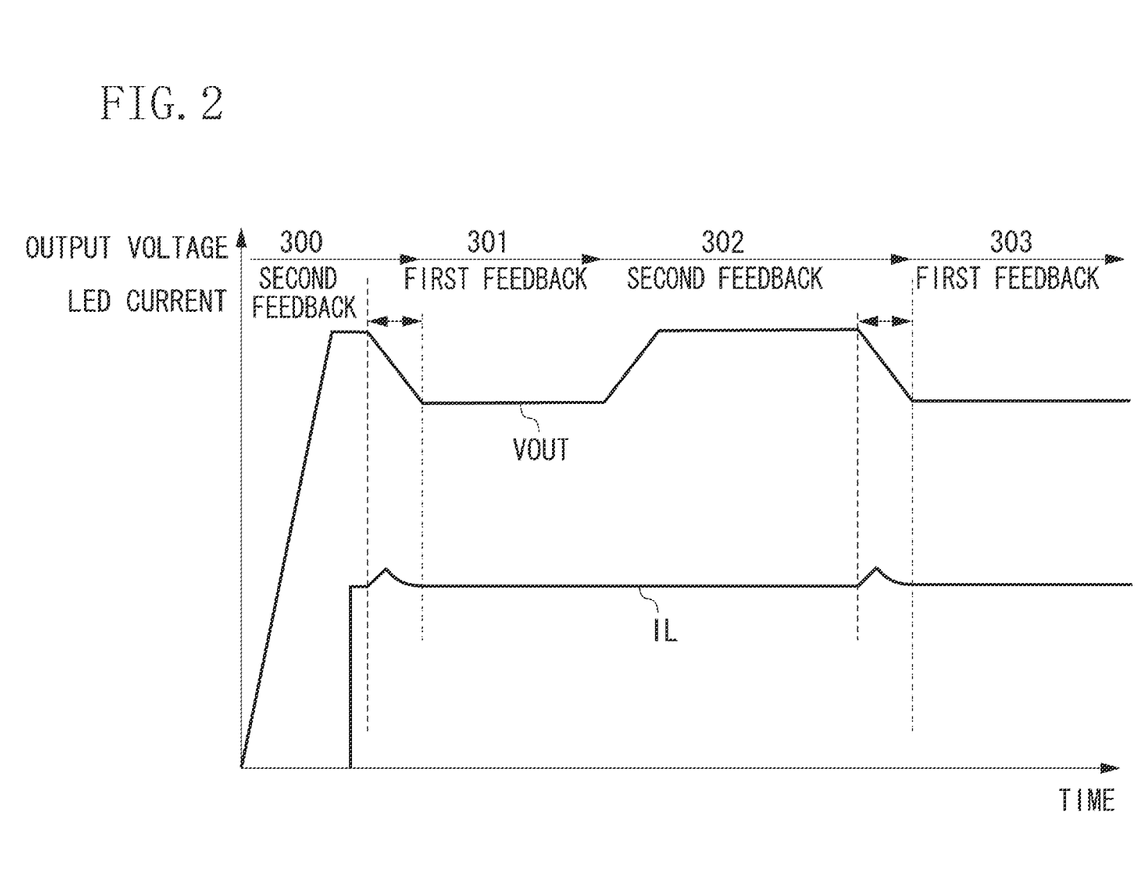
FIG. 2 is a diagram illustrating an example of a relationship between an output voltage from a boosting circuit and a current flowing through a first load circuit.
Figure 3:
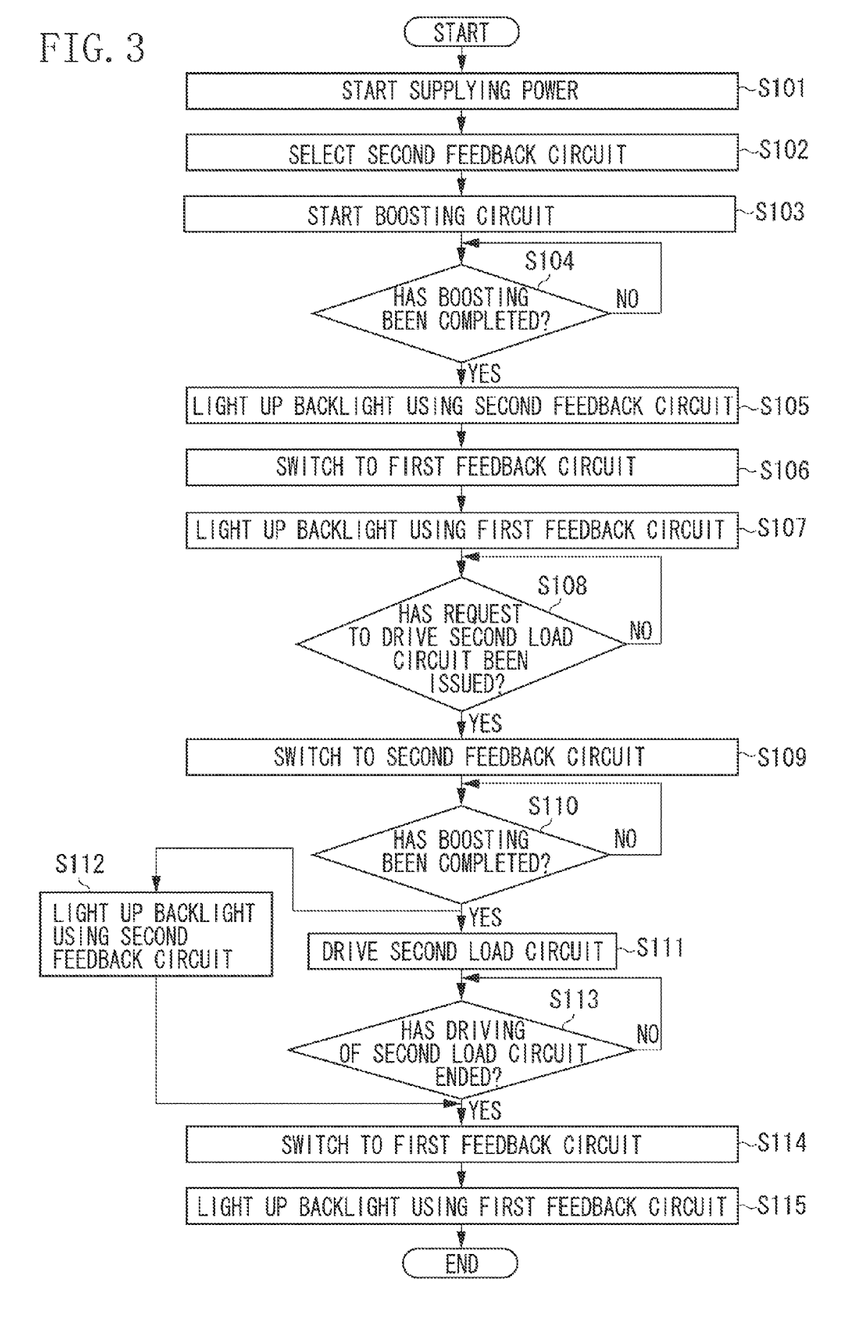
FIG. 3 is a flow chart illustrating an example of an operation of the power supply circuit according to the first exemplary embodiment.

Next, with reference to FIGS. 2 and 3, an operation of the power supply circuit 100 according to the first exemplary embodiment will be described. FIG. 2 is a diagram illustrating an exemplary relationship between the output voltage VOUT from the boosting circuit 2 and a current IL (an LED current), which flows through the first load circuit 3, according to the first exemplary embodiment. FIG. 3 is a flow chart illustrating an exemplary operation of the power supply circuit 100 according to the first exemplary embodiment.

In step S101, power source 1 starts supplying power to the power supply circuit 100. In step S102, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, then in step S103, the boosting circuit 2 performs a boosting operation based on a voltage detected by the output voltage detection circuit 9. If the boosting operation for boosting the input voltage Vin to a target output voltage (e.g., a second voltage V2) has been completed by the boosting circuit 2 (YES in step S104), the control unit 10 causes the constant-current supply 35 in the constant-current circuit 6 to operate. Then, in step S105, the control unit 10 lights up the plurality of LEDs included in the first load circuit 3 (the backlight circuit) and also simultaneously drives the liquid crystal display unit 12. The processes in steps S101 to S105 are performed in a period 300 illustrated in FIG. 2. In the period 300, the output voltage VOUT of the boosting circuit 2 rises to the target output voltage (e.g., the second voltage V2) with a predetermined slope. The plurality of LEDs in the first load circuit 3 are lit up after the boosting operation for boosting the input voltage Vin to this target output voltage (e.g., the second voltage V2) has been completed. Such operation is performed, thereby, when displaying an image or the like on the liquid crystal display device, enabling instantaneous display of the image or the like with an excellent responsiveness.

Next, in this state, power consumption of the first load circuit 3 is: (a voltage required to drive the second load circuit 4)×(an amount of constant current). This is inefficient to drive the backlight circuit which is the first load circuit 3. Thus, in step S106, the control unit 10 subsequently turns off the switches 36 and 38 and turns on the switches 32 and 34 to select the first feedback circuit 7 and the detection resistor circuit 5. While the first feedback circuit 7 and the detection resistor circuit 5 are selected, the power supply circuit 100 operates in the first driving mode. If the first feedback circuit 7 and the detection resistor circuit 5 are selected, the boosting circuit 2 is controlled by the first feedback circuit 7 and the detection resistor circuit 5. The boosting circuit 2 performs a boosting operation based on a voltage dropped by the detection resistor circuit 5. In step S106, the boosting circuit 2 operates so that the output voltage VOUT of the boosting circuit 2 would be a first voltage V1. The first voltage V1 is a voltage lower than the second voltage V2. At this time, in step S107, since the desired LED current IL continues to be supplied to the first load circuit 3, the plurality of LEDs in the first load circuit 3 continue to be lit up. In this state, power consumption of the first load circuit 3 is: (a power required to drive the first load circuit 3+a voltage that allows a normal operation of the constant-current circuit 6)×(an amount of constant current). Thus, it is possible to drive the first load circuit 3 more efficiently than driving the first load circuit 3 using the second feedback circuit 8. The process in step S107 is performed in a period 301 illustrated in FIG. 2. As also illustrated in FIG. 2, when the second feedback circuit 8 is switched to the first feedback circuit 7, the current IL flowing through the first load circuit 3 slightly changes due to a responsiveness of the error amplifier 33 of the first feedback circuit 7. The plurality of LEDs in the first load circuit 3, however, continue to be lit up while the processes in steps S105 to S107 are performed.

Next, if the control unit 10 has issued a request to drive the second load circuit 4 (YES in step S108), then in step S109, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, the boosting circuit 2 performs a boosting operation based on a voltage detected by the output voltage detection circuit 9. If the boosting operation for boosting the input voltage Vin to a predetermined output voltage (e.g., the second voltage V2) has been completed by the boosting circuit 2 (YES in step S110), then in step S111, the control unit 10 outputs a driving command and drives the second load circuit 4 using the output voltage VOUT from the boosting circuit 2. At this time, in step S112, the plurality of LEDs in the first load circuit 3 can continue to be lit up by being driven by the constant-current supply 35 in the constant-current circuit 6. Thus, it is possible to continue to display an image or the like on the liquid crystal display device while the second load circuit 4 is driven. The processes in steps S108 to S112 correspond to the operation performed in a period 302 illustrated in FIG. 2. Consequently, the plurality of LEDs in the first load circuit 3 continue to be lit up while the processes in steps S105 to S112 are performed.

Next, if the driving of the second load circuit 4 has ended (YES in step S113), then in step S114, the control unit 10 turns off the switches 36 and 38 and turns on the switches 32 and 34 to select the first feedback circuit 7 and the detection resistor circuit 5 again. While the first feedback circuit 7 and the detection resistor circuit 5 are selected, the power supply circuit 100 operates in the first driving mode. If the first feedback circuit 7 and the detection resistor circuit 5 are selected, the boosting circuit 2 performs a boosting operation based on a voltage dropped by the detection resistor circuit 5. In step S114, the boosting circuit 2 operates so that the output voltage VOUT of the boosting circuit 2 would be the first voltage V1. Consequently, in step S115, it is possible to reduce power consumption and continue to light up the plurality of LEDs in the first load circuit 3. This operation is the operation performed in a period 303 illustrated in FIG. 2. As described above, when the second feedback circuit 8 is switched to the first feedback circuit 7, the current IL flowing through the first load circuit 3 slightly changes. The plurality of LEDs in the first load circuit 3, however, continue to be lit up while the processes in steps S105 to S115 are performed.

Figure 4:
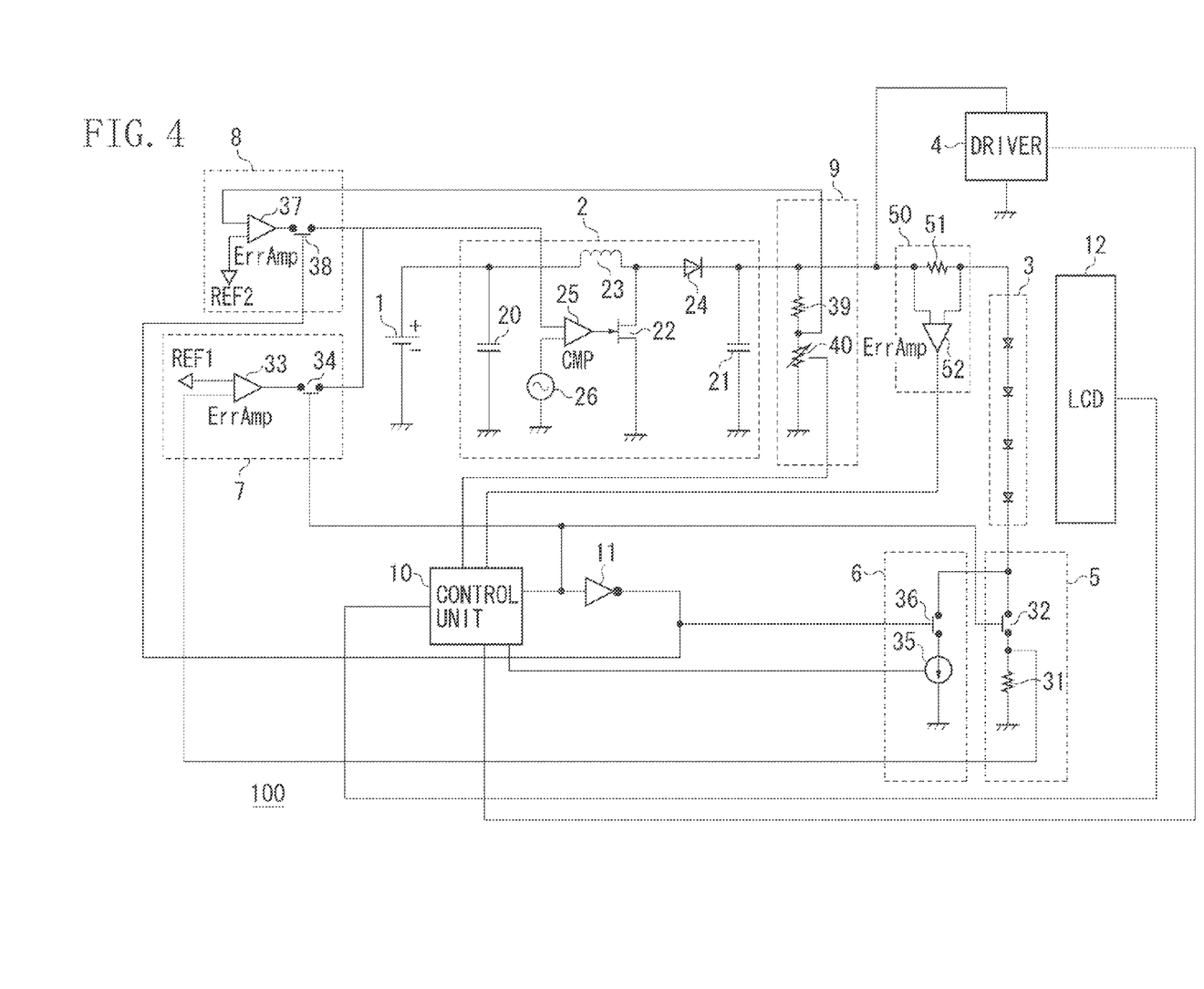
FIG. 4 is a diagram illustrating components of a power supply circuit according to a second exemplary embodiment.

In a second exemplary embodiment, description will be given of a case where a condition of the input voltage Vin from the power source 1 to the boosting circuit 2 and a condition for lighting up the plurality of LEDs included in the first load circuit 3 are changed. FIG. 4 is a diagram illustrating the components of a power supply circuit 100 according to the second exemplary embodiment. In FIG. 4, the components having functions similar to those of the components illustrated in FIG. 1 are designated by the same reference numerals. In the second exemplary embodiment, among the components illustrated in FIG. 4, the components having functions similar to those of the components illustrated in FIG. 1 will not be described. Similarly to the power supply circuit 100 according to the first exemplary embodiment, the power supply circuit 100 according to the second exemplary embodiment also operates as a power supply device applicable to an electronic device such as an imaging device.

One of the differences between the power supply circuit 100 according to the second exemplary embodiment and the power supply circuit 100 according to the first exemplary embodiment lies in the power source 1. In the second exemplary embodiment, the power source 1 is assumed to be a lithium-ion battery having one or two cells, or four to six AA batteries connected in series. The input voltage Vin of the boosting circuit 2 is assumed to be about 4 V to 10 V. Another one of the differences lies in the first load circuit 3. The first load circuit 3 is a circuit that operates as the backlight circuit of a liquid crystal display device and includes a plurality of LEDs. In the second exemplary embodiment, a case is assumed where the first load circuit 3 is a circuit in which three to six white LEDs are connected in series. Thus, in the second exemplary embodiment, a voltage required to drive the first load circuit 3 is assumed to be about 8 V to 18 V.

Further, yet another one of the differences lies in that the power supply circuit 100 includes a current detection circuit 50, which is connected in series between the output node of the boosting circuit 2 and the input end of the first load circuit 3. The current detection circuit 50 includes a current detection resistor 51 and an error amplifier 52. The current detection resistor 51 is connected in series between the output node of the boosting circuit 2 and the input end of the first load circuit 3. To the error amplifier 52, potentials of both ends of the current detection resistor 51 are input, and the error amplifier 52 amplifies and outputs the difference voltage between the input potentials. The control unit 10 can detect the current flowing through the first load circuit 3, using an output of the current detection circuit 50. The control unit 10 controls switching between the first feedback circuit 7 and the second feedback circuit 8 based on the detected current.

Figures 5, 5A:
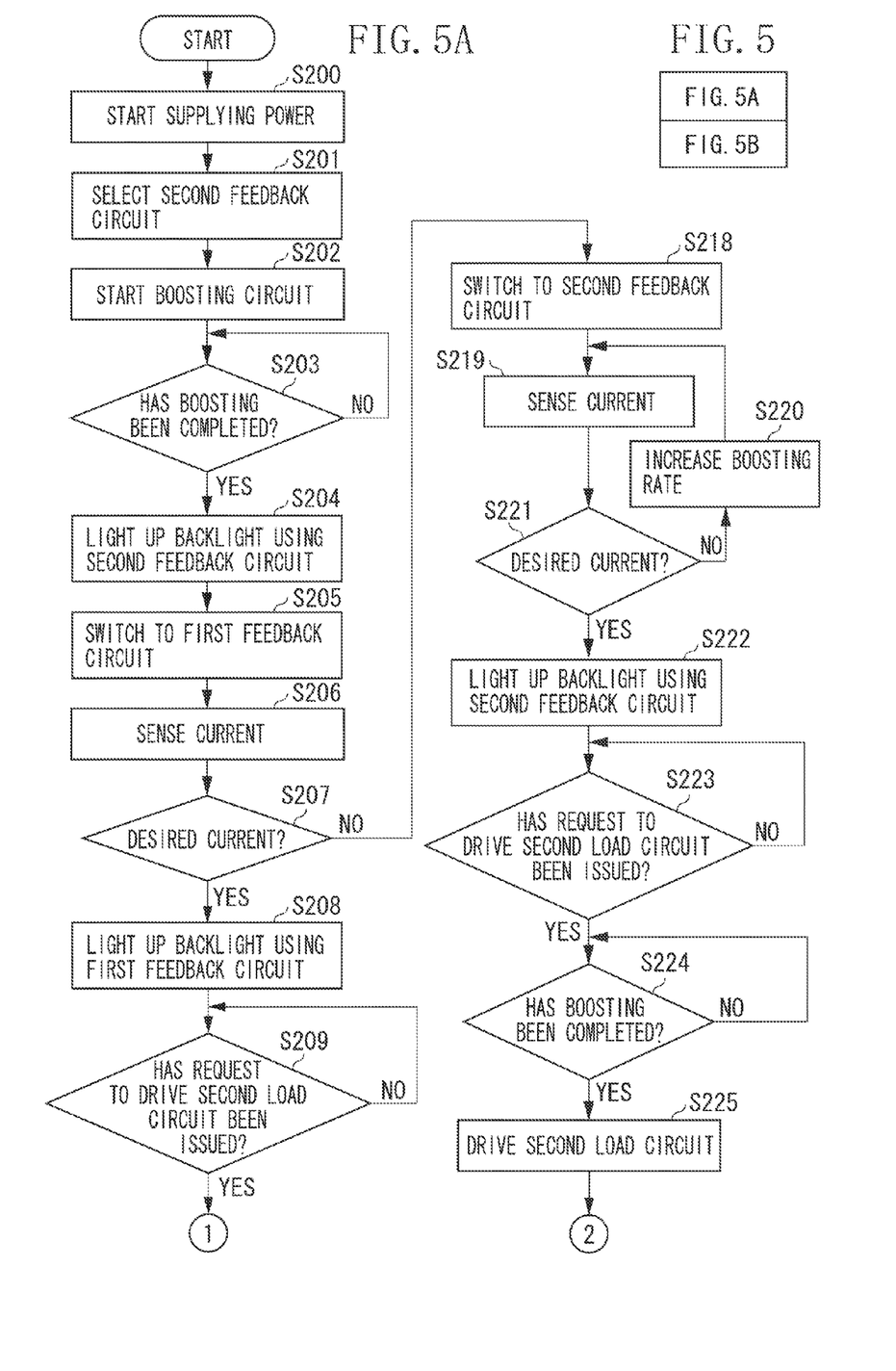
Figure 5B:
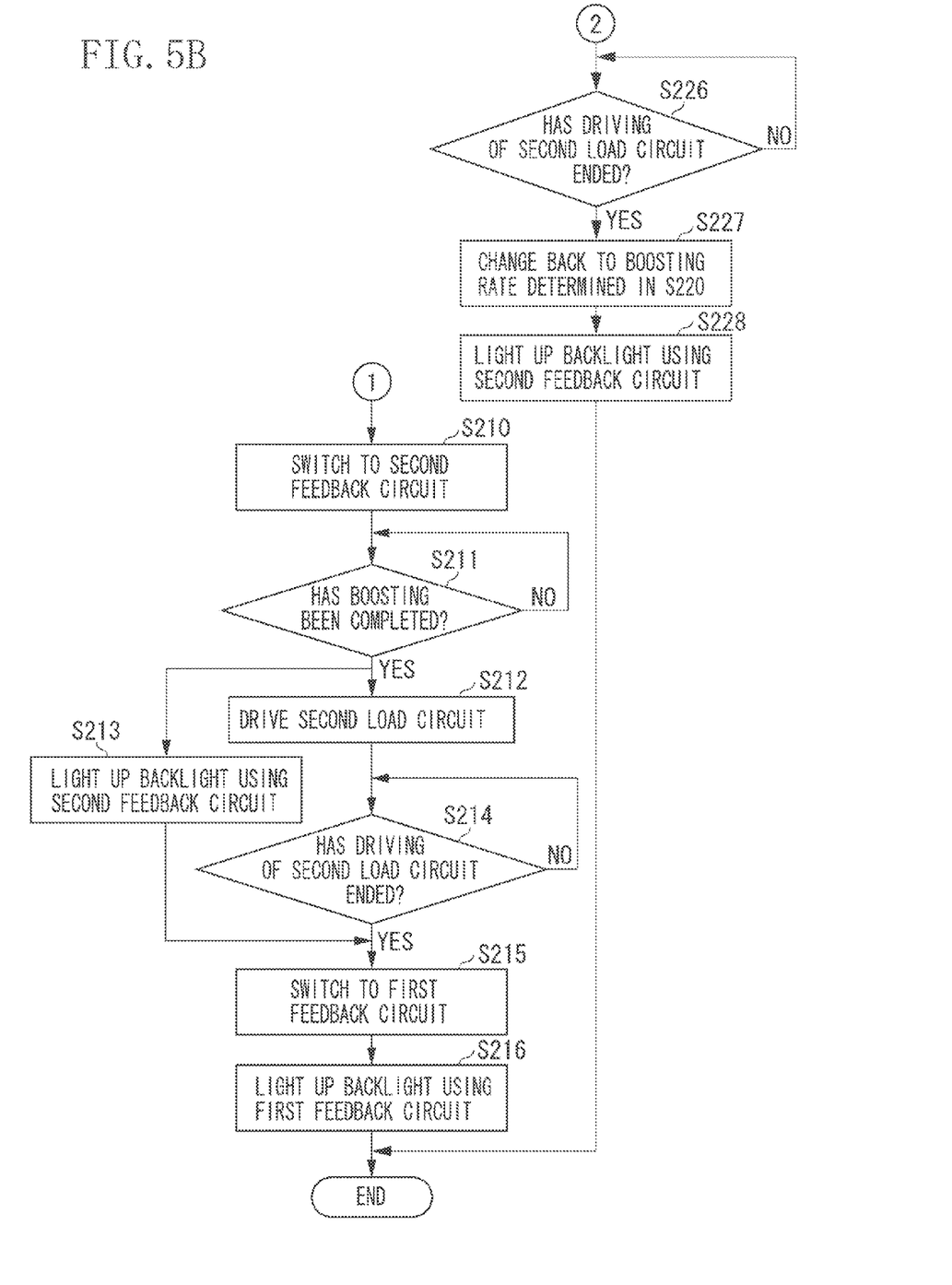

Next, with reference to FIG. 5, an operation of the power supply circuit 100 according to the second exemplary embodiment will be described. FIG. 5 is a flow chart illustrating an exemplary operation of the power supply circuit 100 according to the second exemplary embodiment.

In step S200, the power source 1 starts supplying power to the power supply circuit 100. In step S201, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, then in step S202, the boosting circuit 2 performs a boosting operation based on a voltage detected by the output voltage detection circuit 9. If the boosting operation for boosting the input voltage Vin to a target output voltage (e.g., a second voltage V2) has been completed by the boosting circuit 2 (YES in step S203), the control unit 10 causes the constant-current supply 35 in the constant-current circuit 6 to operate. Then, in step S204, the control unit 10 lights up the plurality of LEDs included in the first load circuit 3 (the backlight circuit) and also simultaneously drives the liquid crystal display unit 12. Such operation is performed, thereby, when displaying an image or the like on the liquid crystal display device, enabling instantaneous display of the image or the like with an excellent responsiveness.

Next, in this state, power consumption of the first load circuit 3 is: (a voltage required to drive the second load circuit 4)×(an amount of constant current). This is inefficient to drive the backlight circuit, which is the first load circuit 3. Thus, in step S205, the control unit 10 subsequently turns off the switches 36 and 38 and turns on the switches 32 and 34 to select the first feedback circuit 7 and the detection resistor circuit 5. While the first feedback circuit 7 and the detection resistor circuit 5 are selected, the power supply circuit 100 operates in the first driving mode. If the first feedback circuit 7 and the detection resistor circuit 5 are selected, the boosting circuit 2 is controlled by the first feedback circuit 7 and the detection resistor circuit 5. The boosting circuit 2 performs a boosting operation based on a voltage dropped by the detection resistor circuit 5. The first load circuit 3 is driven at a constant current. In step S205, the boosting circuit 2 operates so that the output voltage VOUT of the boosting circuit 2 would be a first voltage V1. The first voltage V1 is a voltage lower than the second voltage V2. Consequently, the plurality of LEDs in the first load circuit 3 continue to be lit up while the processes in steps S204 and S205 are performed. Next, in step S206, the control unit 10 detects the current IL flowing through the first load circuit 3, using the current detection circuit 50. In step S207, the control unit 10 determines whether a desired constant-current value has been obtained. At this time, if a condition (an input voltage of the current detection circuit 50)<(a voltage required to drive the first load circuit 3) is satisfied, the desired constant-current value is obtained, whereas if this condition is not satisfied, the desired constant-current value cannot be obtained.

Next, if it has been determined in step S207 that the desired constant-current value has been obtained (YES in step S207), then in step S208, the control unit 10 controls the first feedback circuit 7 so that the desired LED current IL continues to be supplied to the first load circuit 3. Consequently, the desired LED current IL continues to be supplied to the first load circuit 3, and therefore, the plurality of LEDs in the first load circuit 3 continue to be lit up.

Next, if the control unit 10 has issued a request to drive the second load circuit 4 (YES in step S209), then in step S210, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, the boosting circuit 2 performs a boosting operation based on a voltage detected by the output voltage detection circuit 9. If the boosting operation for boosting the input voltage Vin to a predetermined output voltage (e.g., the second voltage V2) has been completed by the boosting circuit 2 (YES in step S211), then in step S212, the control unit 10 outputs a driving command and drives the second load circuit 4 using the output voltage VOUT from the boosting circuit 2. At this time, in step S213, the plurality of LEDs in the first load circuit 3 can continue to be lit up by being driven by the constant-current supply 35 in the constant-current circuit 6. Thus, it is possible to continue to display an image or the like on the liquid crystal display device while the second load circuit 4 is driven.

Next, if the driving of the second load circuit 4 has ended (YES in step S214), then in step S215, the control unit 10 turns off the switches 36 and 38 and turns on the switches 32 and 34 to select the first feedback circuit 7 and the detection resistor circuit 5 again. While the first feedback circuit 7 and the detection resistor circuit 5 are selected, the power supply circuit 100 operates in the first driving mode. If the first feedback circuit 7 and the detection resistor circuit 5 are selected, the boosting circuit 2 performs a boosting operation based on a voltage dropped by the detection resistor circuit 5. In step S215, the boosting circuit 2 operates so that the output voltage VOUT of the boosting circuit 2 would be the first voltage V1. Consequently, in step S216, it is possible to reduce power consumption and continue to light up the plurality of LEDs in the first load circuit 3. Thus, the plurality of LEDs in the first load circuit 3 continue to be lit up while the processes in steps S204 to S216 are performed.

If, on the other hand, it has been determined in step S207 that the desired constant-current value has not been obtained (NO in step S207), then in step S218, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, then in steps S219, S220, and S221, the control unit 10 controls the voltage division ratio of the resistors of the output voltage detection circuit 9 to boost the output voltage VOUT of the boosting circuit 2 until the current detection circuit 50 detects the desired constant-current value. If the desired constant-current value has been obtained (YES in step S221), then in step S222, the plurality of LEDs in the first load circuit 3 are lit up by the output voltage VOUT of the boosting circuit 2 obtained by the control of the second feedback circuit 8.

Next, if the control unit 10 has issued a request to drive the second load circuit 4 (YES in step S223), the control unit 10 maintains a state of selecting the second feedback circuit 8, and the boosting circuit 2 performs a boosting operation based on a voltage detected by the output voltage detection circuit 9. At this time, a boosting rate of the boosting circuit 2 is changed by the control unit 10 controlling the voltage division ratio of the resistors of the output voltage detection circuit 9. Further, the control unit 10 changes the boosting rate of the boosting circuit 2 so that a voltage required to drive the second load circuit 4 is obtained as the output voltage VOUT of the boosting circuit 2. If, in step S224, the boosting operation has been completed by the boosting circuit 2 (YES in step S224), then in step S225, the control unit 10 outputs a driving command and drives the second load circuit 4 using the output voltage VOUT from the boosting circuit 2.

Next, if the driving of the second load circuit 4 has ended (YES in step S226), then in step S227, the control unit 10 controls the voltage division ratio of the resistors of the output voltage detection circuit 9, thereby changing the boosting rate of the boosting circuit 2 to a value determined in step S220. In step S227, the boosting circuit 2 performs a boosting operation based on a voltage detected by the output voltage detection circuit 9. Consequently, the desired LED current IL continues to be supplied to the first load circuit 3, and therefore, in step S228, the plurality of LEDs in the first load circuit 3 continue to be lit up. Thus, the plurality of LEDs in the first load circuit 3 continue to be lit up while the processes in steps S204 to S207 and S218 to S228 are performed.

Next, a third exemplary embodiment will be described.

Figure 6:
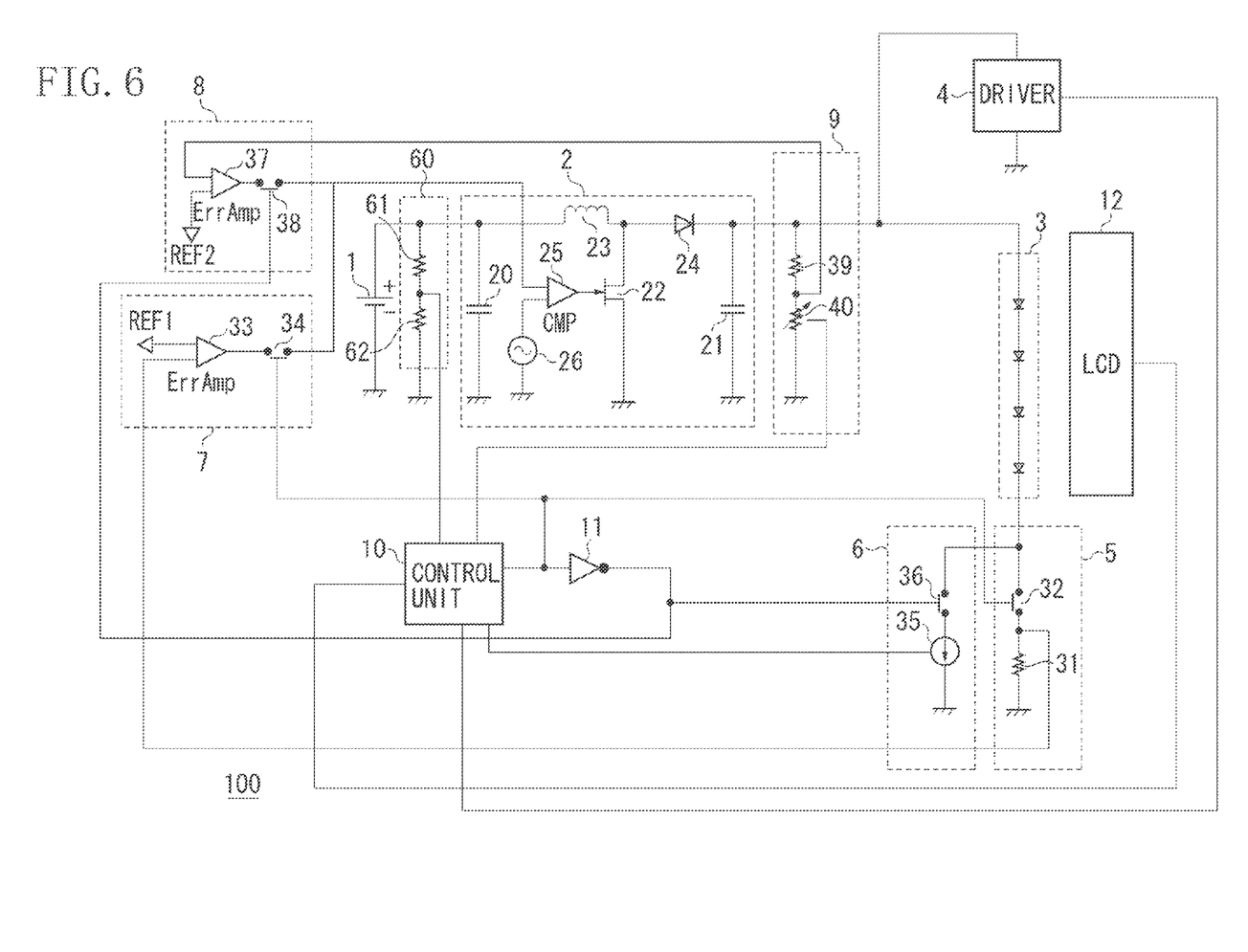
FIG. 6 is a diagram illustrating components of a power supply circuit according to a third exemplary embodiment.

In the third exemplary embodiment, description will be given of a case where a condition of the input voltage Vin from the power source 1 to the boosting circuit 2 and a condition for lighting up the plurality of LEDs included in the first load circuit 3 are changed. FIG. 6 is a diagram illustrating the components of a power supply circuit 100 according to the third exemplary embodiment. In FIG. 6, the components having functions similar to those of the components illustrated in FIG. 1 are designated by the same reference numerals. In the third exemplary embodiment, among the components illustrated in FIG. 6, the components having functions similar to those of the components illustrated in FIG. 1 will not be described. Similarly to the power supply circuit 100 according to the first exemplary embodiment, the power supply circuit 100 according to the third exemplary embodiment also operates as a power supply device applicable to an electronic device such as an imaging device.

One of the differences between the power supply circuit 100 according to the third exemplary embodiment and the power supply circuit 100 according to the first exemplary embodiment lies in the power source 1. In the third exemplary embodiment, the power source 1 is assumed to be a lithium-ion battery having one or two cells or four to six AA batteries connected in series. As a result, the input voltage Vin of the boosting circuit 2 is assumed to be about 4 V to 10 V. Another one of the differences lies in the first load circuit 3. The first load circuit 3 is a circuit that operates as the backlight circuit of a liquid crystal display device and includes a plurality of LEDs. In the third exemplary embodiment, a case is assumed where the first load circuit 3 is a circuit in which three to six white LEDs are connected in series. Thus, in the third exemplary embodiment, a voltage required to drive the first load circuit 3 is assumed to be about 8 V to 18 V.

Further, yet another one of the differences lies in that the power supply circuit 100 includes a voltage detection circuit 60, which detects the voltage at the input node of the boosting circuit 2. The voltage detection circuit 60 includes resistors 61 and 62. The resistors 61 and 62 are connected in series between the input node of the boosting circuit 2 and the ground potential. A potential of the connection point between the resistors 61 and 62 is output as a voltage detected by the voltage detection circuit 60. The control unit 10 can detect an input voltage of the boosting circuit 2 based on an output of the voltage detection circuit 60. The control unit 10 controls switching between the first feedback circuit 7 and the second feedback circuit 8 based on a voltage detected by the voltage detection circuit 60.

Figures 7, 7A:
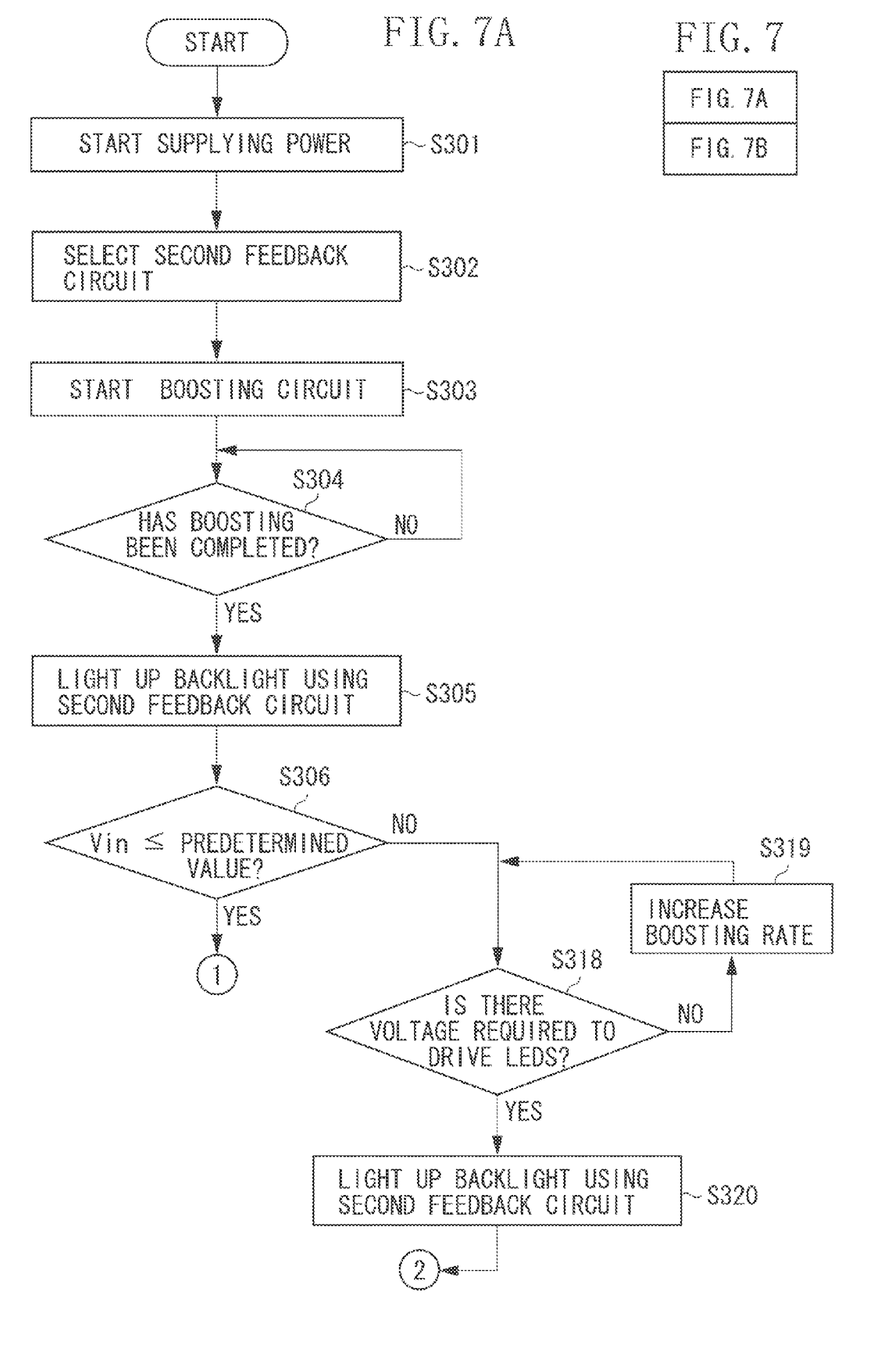
Figure 7B:
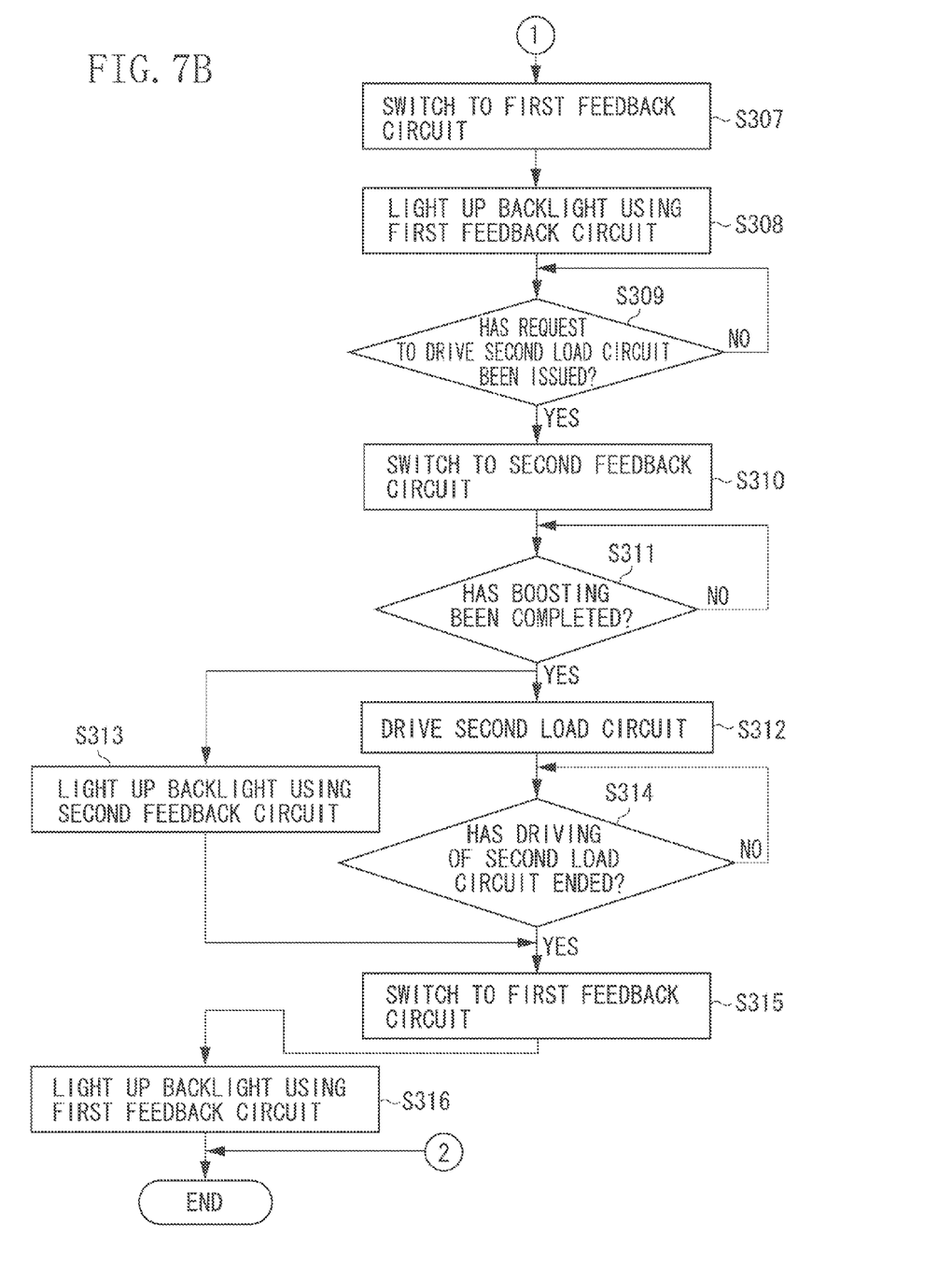

Next, with reference to FIG. 7, an operation of the power supply circuit 100 according to the third exemplary embodiment will be described. FIG. 7 is a flow chart illustrating an exemplary operation of the power supply circuit 100 according to the third exemplary embodiment.

In step S301, the power source 1 starts supplying power to the power supply circuit 100. In step S302, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, then in step S303, the boosting circuit 2 performs a boosting operation based on a voltage detected by the output voltage detection circuit 9. If the boosting operation for boosting the input voltage Vin to a target output voltage (e.g., a second voltage V2) has been completed by the boosting circuit 2 (YES in step S304), the control unit 10 causes the constant-current supply 35 in the constant-current circuit 6 to operate. Then, in step S305, the control unit 10 lights up the plurality of LEDs included in the first load circuit 3 (the backlight circuit) and also simultaneously drives the liquid crystal display unit 12. Such operation is performed, thereby, when displaying an image or the like on the liquid crystal display device, enabling instantaneous display of the image or the like with an excellent responsiveness.

Next, in this state, power consumption of the first load circuit 3 is: (a voltage required to drive the second load circuit 4)×(an amount of constant current). This is inefficient to drive the backlight circuit, which is the first load circuit 3. Thus, it is desirable that the boosting circuit 2 is controlled by the first feedback circuit 7 and the detection resistor circuit 5. In step S306, however, the control unit 10 determines whether an input voltage Vin of the boosting circuit 2 detected by the voltage detection circuit 60 exceeds a predetermined value corresponding to a voltage required to drive the first load circuit 3. In this case, the first voltage V1 is a voltage lower than the second voltage V2.

Next, if it has been determined in step S306 that the input voltage Vin of the boosting circuit 2 does not exceed the predetermined value corresponding to the voltage required to drive the first load circuit 3 (YES in step S306), then in step S307, the control unit 10 turns off the switches 36 and 38 and turns on the switches 32 and 34 to select the first feedback circuit 7 and the detection resistor circuit 5. While the first feedback circuit 7 and the detection resistor circuit 5 are selected, the power supply circuit 100 operates in the first driving mode. If the first feedback circuit 7 and the detection resistor circuit 5 are selected, the boosting circuit 2 is controlled by the first feedback circuit 7 and the detection resistor circuit 5. The boosting circuit 2 performs a boosting operation based on a voltage dropped by the detection resistor circuit 5. In step S307, the boosting circuit 2 operates so that the output voltage VOUT of the boosting circuit 2 would be the first voltage V1. In this case, the first voltage V1 is a voltage lower than the second voltage V2. At this time, in step S308, since the desired LED current IL continues to be supplied to the first load circuit 3, the plurality of LEDs in the first load circuit 3 continue to be lit up.

Next, if the control unit 10 has issued a request to drive the second load circuit 4 (YES in step S309), then in step S310, the control unit 10 turns off the switches 32 and 34 and turns on the switches 36 and 38 to select the constant-current circuit 6 and the second feedback circuit 8. While the constant-current circuit 6 and the second feedback circuit 8 are selected, the power supply circuit 100 operates in the second driving mode. If the constant-current circuit 6 and the second feedback circuit 8 are selected, the boosting circuit 2 performs a boosting operation based on a voltage detected by the output voltage detection circuit 9. If the boosting operation for boosting the input voltage Vin to a predetermined output voltage (e.g., the second voltage V2) has been completed by the boosting circuit 2 (YES in step S311), then in step S312, the control unit 10 outputs a driving command and drives the second load circuit 4 using the output voltage VOUT from the boosting circuit 2. At this time, in step S313, the plurality of LEDs in the first load circuit 3 can continue to be lit up by being driven by the constant-current supply 35 in the constant-current circuit 6. Thus, it is possible to continue to display an image or the like on the liquid crystal display device while the second load circuit 4 is driven.

Next, if the driving of the second load circuit 4 has ended (YES in step S314), then in step S315, the control unit 10 turns off the switches 36 and 38 and turns on the switches 32 and 34 to select the first feedback circuit 7 and the detection resistor circuit 5 again. While the first feedback circuit 7 and the detection resistor circuit 5 are selected, the power supply circuit 100 operates in the first driving mode. If the first feedback circuit 7 and the detection resistor circuit 5 are selected, the boosting circuit 2 performs a boosting operation based on a voltage dropped by the detection resistor circuit 5. In step S315, the boosting circuit 2 operates so that the output voltage VOUT of the boosting circuit 2 would be the first voltage V1. Consequently, in step S316, it is possible to reduce power consumption and continue to light up the plurality of LEDs in the first load circuit 3. Thus, the plurality of LEDs in the first load circuit 3 continue to be lit up while the processes in steps S305 to S316 are performed.

If, on the other hand, it has been determined in step S306 that the input voltage Vin of the boosting circuit 2 exceeds the predetermined value corresponding to the voltage required to drive the first load circuit 3 (NO in step S306), then in steps S318 and S319, the control unit 10 maintains a state of selecting the second feedback circuit 8, and the boosting circuit 2 performs a boosting operation based on a voltage detected by the output voltage detection circuit 9. The boosting circuit 2 appropriately changes a boosting rate and performs the boosting operation for boosting the input voltage Vin to the voltage required to drive the first load circuit 3. In step S320, the first load circuit 3 is driven at a constant current by the output voltage VOUT of the boosting circuit 2. Consequently, the plurality of LEDs in the first load circuit 3 continue to be lit up while the processes in steps S305, S306, and S318 to S320 are performed.

At least one of the various functions, processes, and methods described in the first to third exemplary embodiments can be achieved using a program. Hereinafter, in a fourth exemplary embodiment, a program for realizing at least one of the various functions, processes, and methods described in the first to third exemplary embodiments will be referred to as a "program X". Further, in the fourth exemplary embodiment, a computer for executing the program X will be referred to as a "computer Y". Examples of the computer Y include a personal computer, a microcomputer, and a central processing unit (CPU).

At least one of the various functions, processes, and methods described in the first to third exemplary embodiments can be realized by the computer Y executing the program X. In this case, the program X is supplied to the computer Y via a computer readable storage medium. A computer readable storage medium according to the fourth exemplary embodiment includes at least one of a hard disk device, an optical disc, a Compact Disc Read Only Memory (CD-ROM), a Compact Disc Recordable (CD-R), a memory card, a read only memory (ROM), and a random access memory (RAM). Further, the computer readable storage medium according to the fourth exemplary embodiment is a non-transitory storage medium.

While the present invention is described with reference to exemplary embodiments, it is to be understood that the present invention is not limited to the exemplary embodiments. The scope of the following claims is to be accorded the broadest interpretation so as to encompass all modifications and equivalent structures.

This application claims the benefit of Japanese Patent Application No. 2013-210484, filed Oct. 7, 2013, which is hereby incorporated by reference herein in its entirety.

What is claimed is:

1. A power supply device comprising:
   a first load circuit, including a backlight circuit for a display device having a plurality of light emitting diodes (LEDs), that operates by a first voltage;
   a second load circuit that operates by a second voltage higher than the first voltage;
   a boosting circuit that generates the first voltage if the power supply device is in a first driving mode, and generates the second voltage if the power supply device is in a second driving mode;
   a first feedback circuit that connects the first load circuit and the boosting circuit if the power supply device is in the first driving mode;
   a second feedback circuit that connects the first load circuit and the boosting circuit if the power supply device is in the second driving mode; and
   a control unit, including a microprocessor, that causes the first load circuit to operate if the power supply device is in the first driving mode, and causes the first load circuit and the second load circuit to operate if the power supply device is in the second driving node,
   wherein in the first driving mode,
      a detection resistor circuit is selected as a driving circuit for the first load circuit and the first feedback circuit is selected, and
      the boosting circuit performs a boosting operation based on an output of the first load circuit, thereby outputting output voltage Vout according to a sum of forward voltages Vf of the plurality of LEDs, resulting in the first load circuit being driven at a constant current; and
   wherein in the second driving mode,
      a constant-current circuit is selected as a driving circuit for the first load circuit and an output voltage detection circuit and the second feedback circuit is selected
      output voltage Vout of the boosting circuit is determined, and based on a voltage detected by the output voltage detection circuit, the boosting circuit generates output voltage Vout required to drive the second load circuit.

2. The power supply device according to claim 1, wherein the second load circuit includes a circuit that drives a piezoelectric element.

3. The power supply device according to claim 1, wherein the power supply device is applied to an imaging device.

4. The power supply device according to claim 1, wherein the power supply device is applied to an interchangeable lens camera.

5. The power supply device according to claim 1, wherein the first voltage is about 8 V to 18 V.

6. The power supply device according to claim 1, wherein the second voltage is 20 V or more.

* * * * *